(12) United States Patent
Stipe

(10) Patent No.: US 9,564,838 B2
(45) Date of Patent: Feb. 7, 2017

(54) MAGNETIC LEVITATION DEVICE FOR PROLONGED ROTATION

(71) Applicant: Barry Stipe, San Jose, CA (US)

(72) Inventor: Barry Stipe, San Jose, CA (US)

( * ) Notice: Subject to any disclaimer, the term of this patent is extended or adjusted under 35 U.S.C. 154(b) by 351 days.

(21) Appl. No.: 14/469,820

(22) Filed: Aug. 27, 2014

(65) Prior Publication Data
US 2016/0065098 A1    Mar. 3, 2016

(51) Int. Cl.
*H02N 15/00*    (2006.01)

(52) U.S. Cl.
CPC .................... *H02N 15/00* (2013.01)

(58) Field of Classification Search
CPC ........... H02N 15/00; H02N 15/04; H02K 7/09
See application file for complete search history.

(56) References Cited

U.S. PATENT DOCUMENTS

| | | | | |
|---|---|---|---|---|
| 3,597,022 A * | 8/1971 | Waldron | ............... | F16C 39/063 310/90.5 |
| 5,396,136 A * | 3/1995 | Pelrine | ............... | F16C 32/0438 310/90.5 |
| 5,404,062 A * | 4/1995 | Hones | .................... | H02N 15/00 310/90.5 |
| 5,652,472 A * | 7/1997 | Tozoni | .................... | B60L 13/04 104/281 |
| 7,023,117 B2 * | 4/2006 | Fremerey | ............ | F16C 32/0408 310/90.5 |
| 8,368,271 B2 * | 2/2013 | Wiggins | ................. | H02K 7/025 310/103 |
| 2014/0192613 A1* | 7/2014 | Terentiev | ............ | B01F 7/00908 366/289 |

* cited by examiner

*Primary Examiner* — Tran Nguyen
(74) *Attorney, Agent, or Firm* — Colin Fowler

(57) ABSTRACT

Disclosed is a magnet in a high vacuum tube levitated by at least one magnet outside the tube and stabilized by at least one diamagnet inside or outside the tube. The magnet may have a rotational symmetry axis aligned with the magnetization axis and the diamagnet may be laminated to minimize eddy-current damping. The magnet or magnets outside the tube are used to control the levitation position and to temporarily bring the magnet into contact with a part of the tube structure. Contact is used in combination with a rotor to initiate the spinning motion of the magnet. The passively spinning and levitating magnet will continue to spin for an unusually long period of time due to the lack of contact and extremely low air drag and eddy-current friction.

20 Claims, 10 Drawing Sheets

MAGNETIC LEVITATION DEVICE FOR PROLONGED ROTATION

FIELD OF THE INVENTION

The present invention related to the field of magnetic levitation. More particularly, the present invention relates to imparting rotational force to a levitating magnet while in a vacuum.

BACKGROUND OF THE INVENTION

The invention relates to the design of an ultra-low-friction rotating device for demonstration and amusement purposes. People have always been fascinated by the concept of perpetual motion which would imply motion continuing indefinitely without an external source of energy. Perpetual motion is impossible in practice since some form of friction is always present. To the extent that a body in motion will interact with other bodies or particles, friction will result. Celestial bodies can appear to achieve perpetual motion but are ultimately affected by interactions with particles.

According to Ernshaw's theorem, it is not possible to achieve stable levitation of a static magnet using other static magnets. However stable magnetic levitation is possible if diamagnets such as bismuth, graphite, or superconductors are used. Magnetic levitation may also be temporarily spin-stabilized without diamagnets as long as the levitating magnet is spinning at the proper rate. This approach has been popularized by the Levitron device which spins and precesses in air for a few minutes and continues indefinitely if air currents or magnetic pulses are used to supply energy.

Previously, ultra-low friction flywheels have been devised for energy storage which use magnets and superconductors in a high vacuum. High vacuum pumps and liquid nitrogen are continuously used and must be considered energy inputs. The magnetic bearing is typically spun up either with a gas stream feedthrough into the vacuum or with a magnetic motor attached to the same shaft. For viscous flow (low Reynolds number) high vacuum is needed because, until the mean free path of the gas molecules becomes comparable to the size of the rotor or rotor-stator gap, the viscosity and gas friction is independent of pressure. In practice, pressures below $10^{-2}$ torr are typically needed before friction drops linearly with pressure. One of the elements of the present invention is the use of vacuum tube technology which easily attains $10^{-6}$ torr without active pumping. When a half inch disk magnet is spun at atmospheric pressure, it has been found that spinning lasts approximately one hour. Assuming the drag is dominated by gas friction and this can be reduced linearly in the range between $10^{-2}$ and $10^{-6}$ torr, the magnet will spin for over 10,000 hours (more than one year) at this lower pressure. It is the purpose of this invention to simulate the near perpetual rotation of a celestial body due to weightlessness and high vacuum in a desktop device for demonstration and amusement purposes. It is also possible that the device can be used as a very sensitive torque or motion sensor.

Accordingly, there is need to create a device which levitates and spins an object for extended periods of time with a single, one-time energy input while additionally being low in cost.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference and should be treated as if each was reprinted here.

Such incorporations include U.S. Pat. No. 6,779,462 (Inventor: Viktors Berstis; Issued on Oct. 5, 2004), titled "Gravimetric Measurement Method and System"; U.S. Pat. No. 8,368,271 (Inventor: Daniel C. Wiggins; Issued on Feb. 5, 2013), titled "Magnetically Suspended Flywheel Energy Storage System with Magnetic Drive"; U.S. Pat. No. 5,396,136 (Inventor: Ronald E. Pelrine; Issued on Jul. 7, 1995), titled "Magnetic Field Levitation"; U.S. Pat. No. 5,404,062 (Inventor: Hones, et al.; Issued on Apr. 4, 1995), titled "Magnetic Levitation Device and Method"; U.S. Pat. No. 3,597,022 (Inventor: Robert D. Waldron; Issued on Aug. 3, 1971), titled "Diamagnetic Levitation Device and/or Stabilizing Devices"; PCT Patent App. No. PCT/GB2013/051953 (Inventor: Maximillian Michaelis, Filed on Jul. 22, 2013), titled "Levitation Device with Horizontal Spin Axis"; C Speake and T. Quinn, "The Search for Newton's Constant," Physics Today 67, 27 (2014); M. D. Simon et al., "Diamagnetically Stabilized Magnet Levitation," Am. J. Phys. 69, 702 (2001); K. B. Ma et. Al, "Superconductor and Magnet Levitation Devices," Rev. Sci. Inst. 74, 4989 (2003); A. D. Chew et. al., "Performance of a Rotating Disc Vacuum Gauge in Transitional and Viscous Flow Regimes," Vacuum 46, 773 (1995).

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

SUMMARY OF THE PRESENT INVENTION

It is an object of the present invention to create a device which levitates and spins an object for extended periods of time with a single, one-time energy input while additionally being low in cost.

A first aspect of the present invention teaches, a device comprising: vacuum enclosure which is permanently sealed and at least partially transparent; a contact surface, the contact surface inside and affixed to the vacuum enclosure; a floating magnet, the floating magnet comprised at least in part of a permanent magnet and contained within the vacuum enclosure; at least one lifting magnet, the at least one lifting magnet supplying an adjustable magnetic field for levitating the floating magnet to an adjustable height, the adjustable height including both a free floating height and an abutting contact surface height; at least one diamagnet, the at least one diamagnet providing a repulsive magnetic force to the floating magnet to stabilize the levitation of the floating magnet; a rotational motor, the rotational motor providing rotation to the vacuum enclosure and contact surface, wherein the rotational motor imparts rotational momentum to the floating magnet through friction with the contact surface when the floating magnet is at an abutting contact surface height.

Within the first aspect of the present invention, there are numerous ways in which the device would be configured. An example of one such configuration would involve a free floating magnet framed above and below by a diamagnetic block. The floating magnet and diamagnetic blocks would be supported by and contained within a vacuum tube bulb. The floating magnet is levitated by lifting magnet external to the vacuum tube bulb and positioned above the floating magnet using an attractive magnetic field. The lifting magnet is moveable up and down such that the magnetic field provided by the lifting magnet has an adjustable effect over the levitation height of the floating magnet. Upon reducing the distance between the floating magnet and the lifting magnet, the floating magnet will be drawn through attractive force into contact with the upper diamagnetic block. Using a rotational motor to spin the vacuum tube bulb and by association the diamagnets contained inside, rotational momentum is imparted to the floating magnet held in contact with the upper diamagnet by the lifting magnet. Once the distance between the lifting magnet and the floating magnet is increased, the floating magnet will sink down, and settle evenly between the two diamagnets and continue to spin until ambient forces decay the rotational momentum of the floating magnet after a prolonged period of time.

It is an additional object of the present invention to provide a device which accurately measure gravitational force.

A second aspect of the present invention teaches the use of a vacuum enclosure including a floating magnet with an affixed test mass, at least one diamagnet used to stabilize the levitation of the floating magnet and contained within the vacuum enclosure, a lifting magnet to levitate the floating magnet and test mass, source masses to apply gravitational force to the floating magnet and test mass, and measurement apparatus.

DETAILED DESCRIPTION

Figure 1:
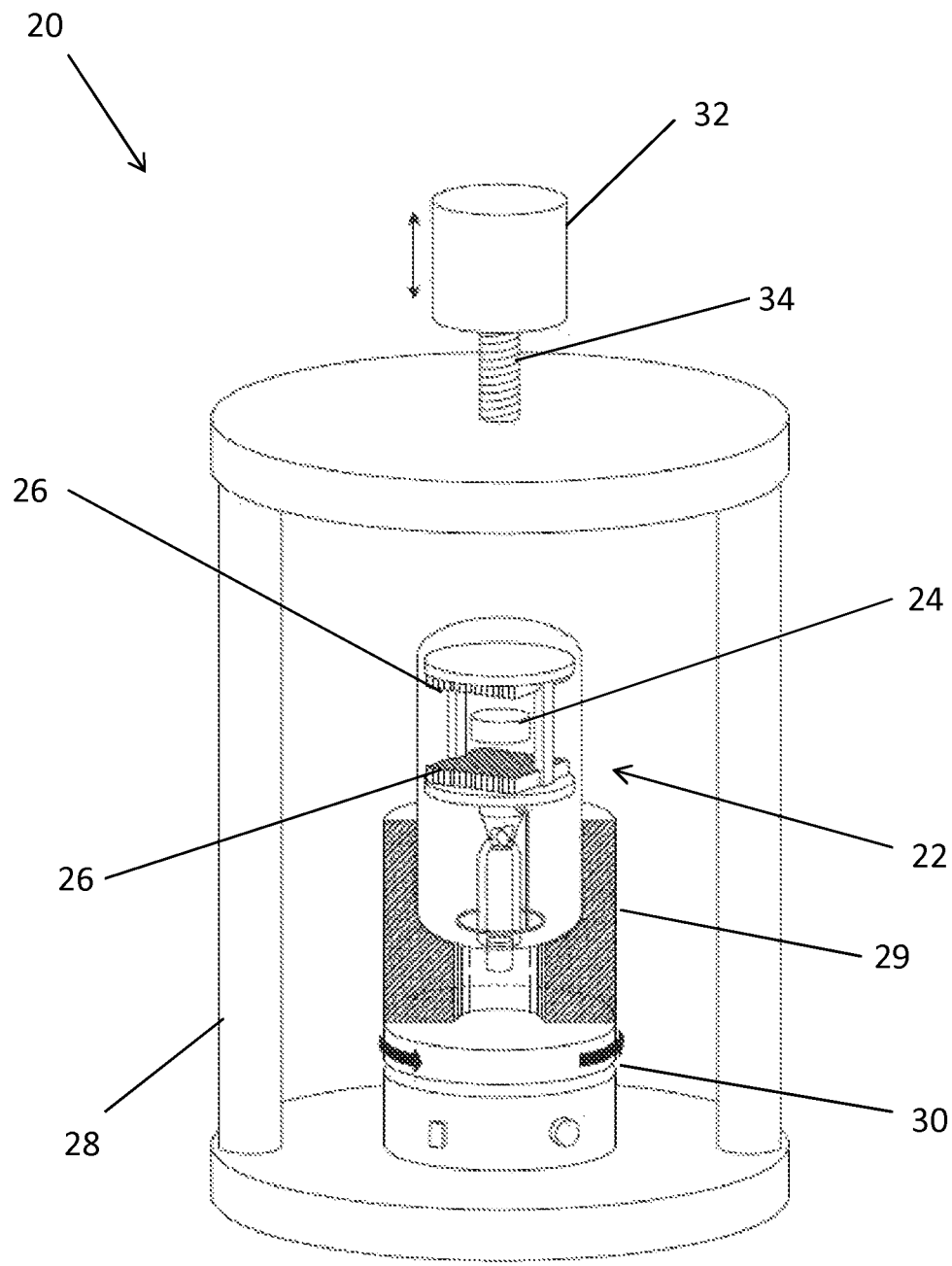
FIG. 1 is a perspective view of a first embodiment of the invented device.

Referring now to FIG. 1, FIG. 1 is a perspective view of a first embodiment 20 of the invented device. The invented device includes a vacuum enclosure 22, containing a floating magnet 24 and diamagnets 26. Outside of the vacuum enclosure 22 is a supporting structure 28, a rotational motor 30, and a lifting magnet 32. The floating magnet 24 of the first embodiment 20 is levitated by the lifting magnet 32 and is stabilized by the diamagnets 26. In other embodiments, the diamagnets 26 could be positioned outside of the vacuum enclosure 22. In the first embodiment 20, the floating magnet 24 would have a rotational symmetry axis aligned with the magnetization axis. The lifting magnet or magnets 32 outside the vacuum enclosure 22 are used to control the levitation position and to temporarily bring the floating magnet 24 into contact with a part of the vacuum enclosure 22 structure. The high vacuum enclosure 22 is placed in a holder 29 which sits on the rotational motor 30 which can rotate the vacuum enclosure 22 at typical frequencies of 1-10 Hz. The rotational motor 30 can optionally be replaced with a turntable-like device wherein rotational momentum is applied to the vacuum enclosure 22 through other means such as hand torqueing. Acrylic or polycarbonate is a good choice for the supporting structure 28 and tube holder 29 since those materials are insulating and inexpensive, though other materials with these properties are also suitable, such as wood and glass. Borosilicate glass has the advantage of very small thermal expansion coefficient and is a good choice for the vertical rods that support the lifting magnet 32 if the device is to be used over a broad temperature range. Retaining clips or a movable ring are optionally used around the perimeter to help ensure the vacuum enclosure 22 and holder 29 do not spin off the rotational motor 30. In the first embodiment the lifting magnet 32 is affixed to a screw 34 which screws into a tapped hole in the supporting structure 28.

Figure 2:
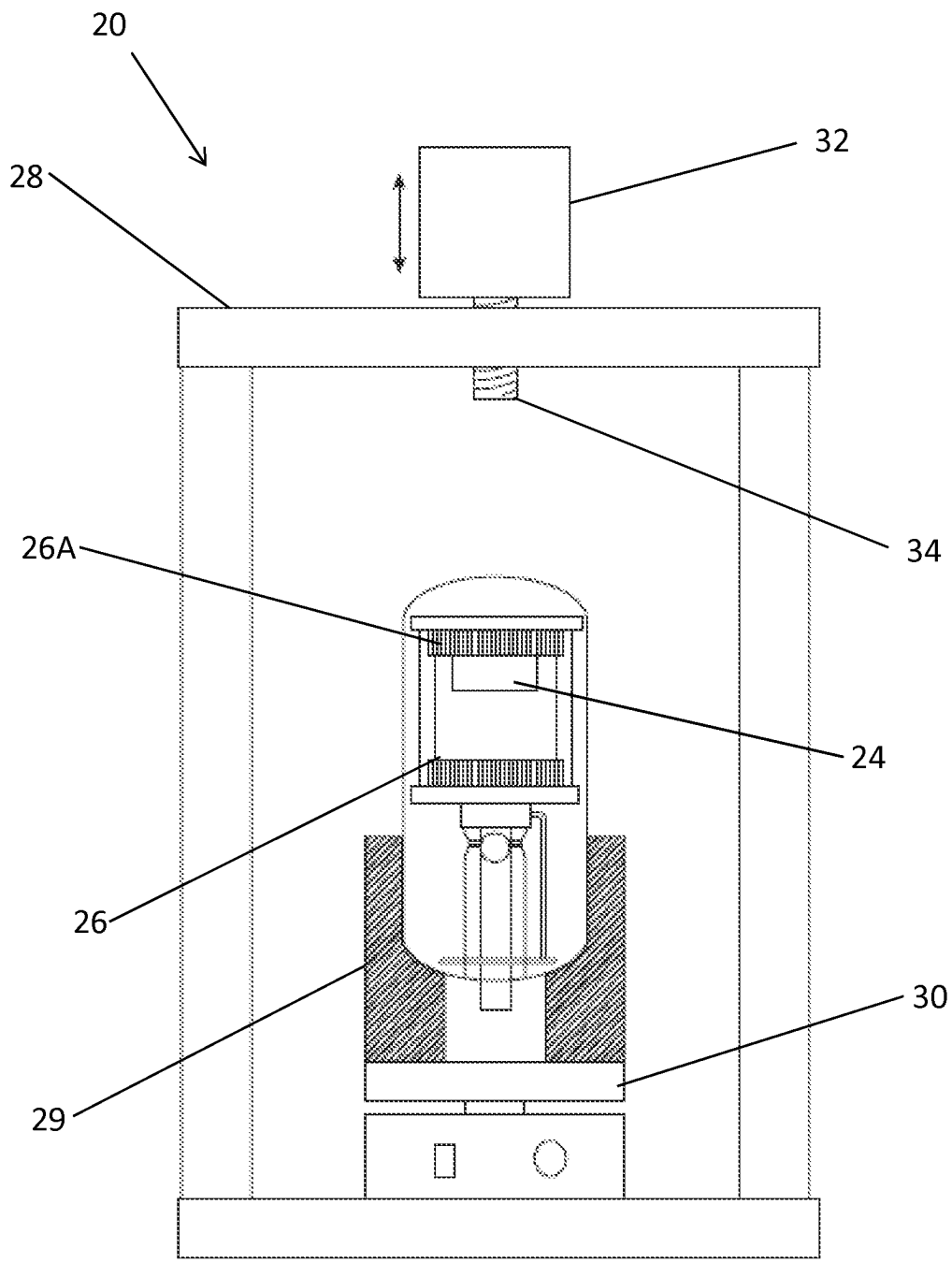
FIG. 2 is a perspective view of the invented device with a lowered lifting magnet and a floating magnet abutting a diamagnet.
Figure 3:
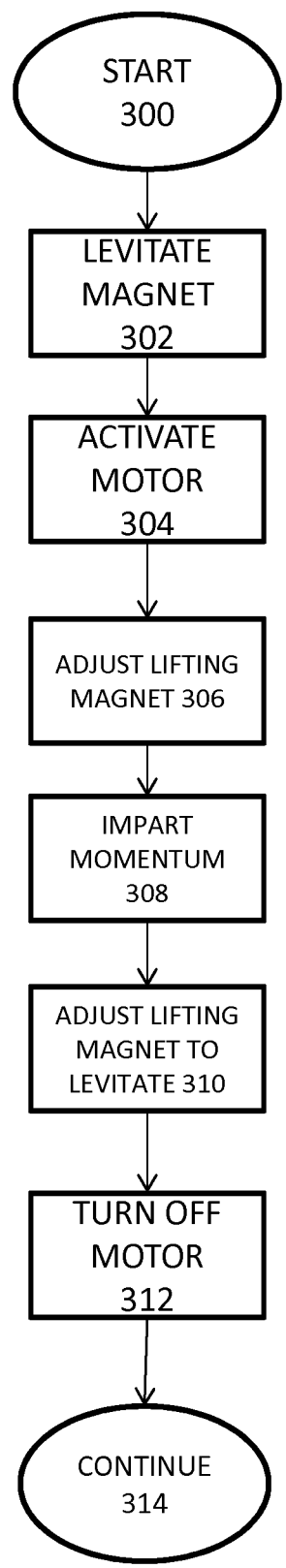
FIG. 3 is a flowchart depicting the method of use for a first embodiment of the present invention.

Referring now to FIGS. 2 and 3, FIG. 2 is a perspective view of a first embodiment 20 of the invented device with a lowered lifting magnet 32 and a floating magnet 24 abutting a diamagnet 26. FIG. 3 is a flow chart explaining a method of use for the invented device. To spin the floating magnet 24, the lifting magnet 32 position are first adjusted until levitation is achieved (302). This occurs when the lifting magnet 32 balances the force of gravity on the floating magnet 24 and when the rotational motor 30 is positioned directly below the lifting magnet 32. This adjustment is made by changing the extent to which the lifting magnet 32 is screwed into the supporting structure 28 with the screw 34. The rotational motor 30 is then turned on and the vacuum enclosure 22 is rotated (304). To bring the magnet into contact with the rotating upper diamagnetic plate 26A, the lifting magnet 32 is lowered through use of the screw 34 and attractive magnetic force draws the floating magnet 24 upwards (306). To keep the floating magnet 24 in contact with the upper diamagnet 26A centered with the axis of rotation, a shallow circular step may be formed in the upper diamagnet 26A which is slightly larger than the floating magnet 24. Once the floating magnet 24 is rotating at the same rate as the rest of the vacuum enclosure 22 (308), the lifting magnet 32 is raised back to its initial position with the screw 34 and the floating magnet 24 levitates while spinning (310). The user would then turn off the motor (312). The passively spinning and levitating floating magnet 24 will continue to spin for an unusually long period of time due to the lack of contact and extremely low air drag and eddy-current friction.

The process may be altered such that the rotational motor 30 is activated (304) after the floating magnet has been brought into contact with the upper diamagnet 26A (306). It is unnecessary that the floating magnet 24 be drawn into the upper diamagnet 26A. Rather, any suitable contact surface inside the vacuum enclosure 22 would suffice. When the floating magnet 24 separates from the contacting surface and begins levitating, it has been found useful to place a block or ring of highly conductive metal (such as aluminum or copper) near the vacuum enclosure 22 to damp out lateral motion until the floating magnet 24 spins steadily. Once the motor 30 is turned off, the motor 30 can be carefully replaced with a simple pedestal of the same height to create a cleaner looking display.

The lifting magnet 32 of the invented device could be constructed of numerous materials or use other means to achieve the desired results. In the first embodiment 20 of the present invention, a rare earth magnet such as Samarium-Cobalt (SmCo) or Neodymium-Iron-Boron (NdFeB) would be used since these types of permanent magnets have a large magnetic moment in a small volume. A mild steel backing rod can be attached to the permanent magnet to enhance the moment at low cost. A low cost ceramic magnet could also be used. SmCo has the advantage of a smaller temperature coefficient of magnetization compared to NdFeB or ceramic which will increase the operating temperature range of levitation without accidental contact. As a replacement to a rare earth magnet, an electromagnet would also suffice. Instead of using a screw 34 to adjust the height and therefore the magnet field of the lifting magnet 32, the power input to the electromagnet could be adjusted to adjust the size and effect of the magnetic field generated. This option carries with it the advantage of requiring no physical adjustments of the lifting magnet 32 which could potentially jostle the floating magnet 24 into contact friction with the surrounding device, but would also have the disadvantage of requiring additional power input to function beyond the initial activation. A similar lifting magnet 32 configuration to the use of an electromagnet would utilize a superconductor with varying levels of superconducting current. In this case no additional power input would be needed after the superconducting current is set, however, unless a room-temperature superconductor is discovered in the future, a constant supply of liquid nitrogen would be needed.

Figure 4:
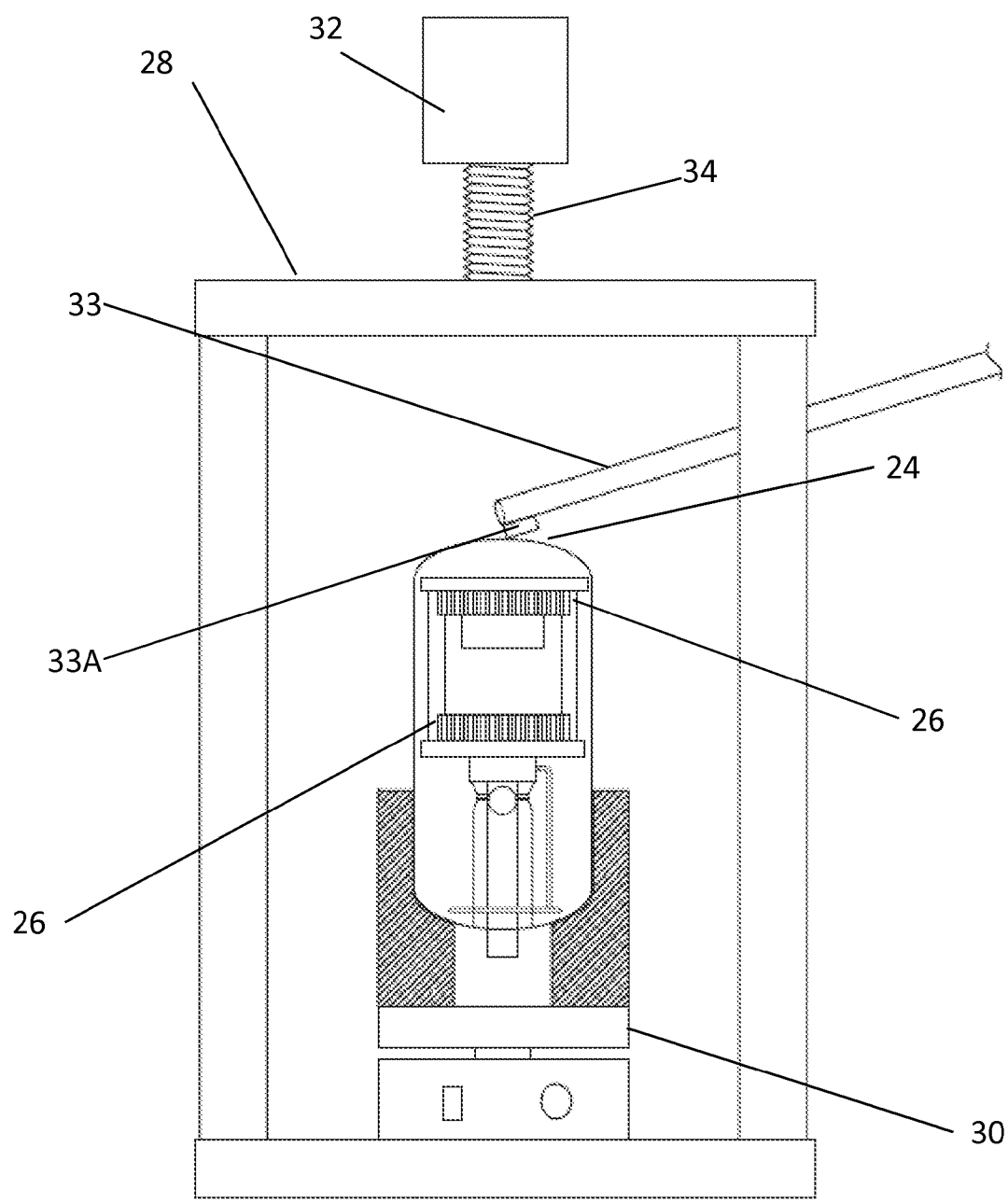
FIG. 4 is a perspective view of the invented device with supporting lifting magnet wand and a floating magnet abutting a diamagnet.

Referring now to FIG. 4, FIG. 4 is a perspective view of the invented device with supporting lifting magnet wand 33 and a floating magnet 24 abutting a diamagnet 26. Another embodiment of the lifting magnet 32 is to use the combination of multiple magnets. To adjust the levitation of the floating magnet 24, a second lifting magnet 33A on a wand 33 would be used to position the floating magnet 24 as needed. This embodiment would have the advantage over the use of an adjustable single lifting magnet 32 in that no physical contact with the device which could jostle the floating magnet would be required. However, there is the potential for a user to lose the lifting magnet wand 33, and an additional required object may reduce the aesthetic appeal of the device. The embodiment in FIG. 4 could also optionally include a screw 34 which allows the lifting magnet to be adjustable relative to the floating magnet.

Another advantage of the use of the lifting magnet wand 33 is that the floating magnet 24 could be directed to different surfaces inside the vacuum enclosure 22, such as the inner wall of a tube as discussed above. When the lifting magnet wand's 33 magnetic field was removed, properly positioned diamagnets 26 would direct the floating magnet back into a position of stable levitation. All discussion of lifting magnets 32 thus-far has made use of attractive magnetic force; however, configurations for floating magnet 24 levitation stabilized by diamagnets 26 utilizing repulsive magnetic force exist. The incorporated references include discussions of these configurations.

Figure 5:
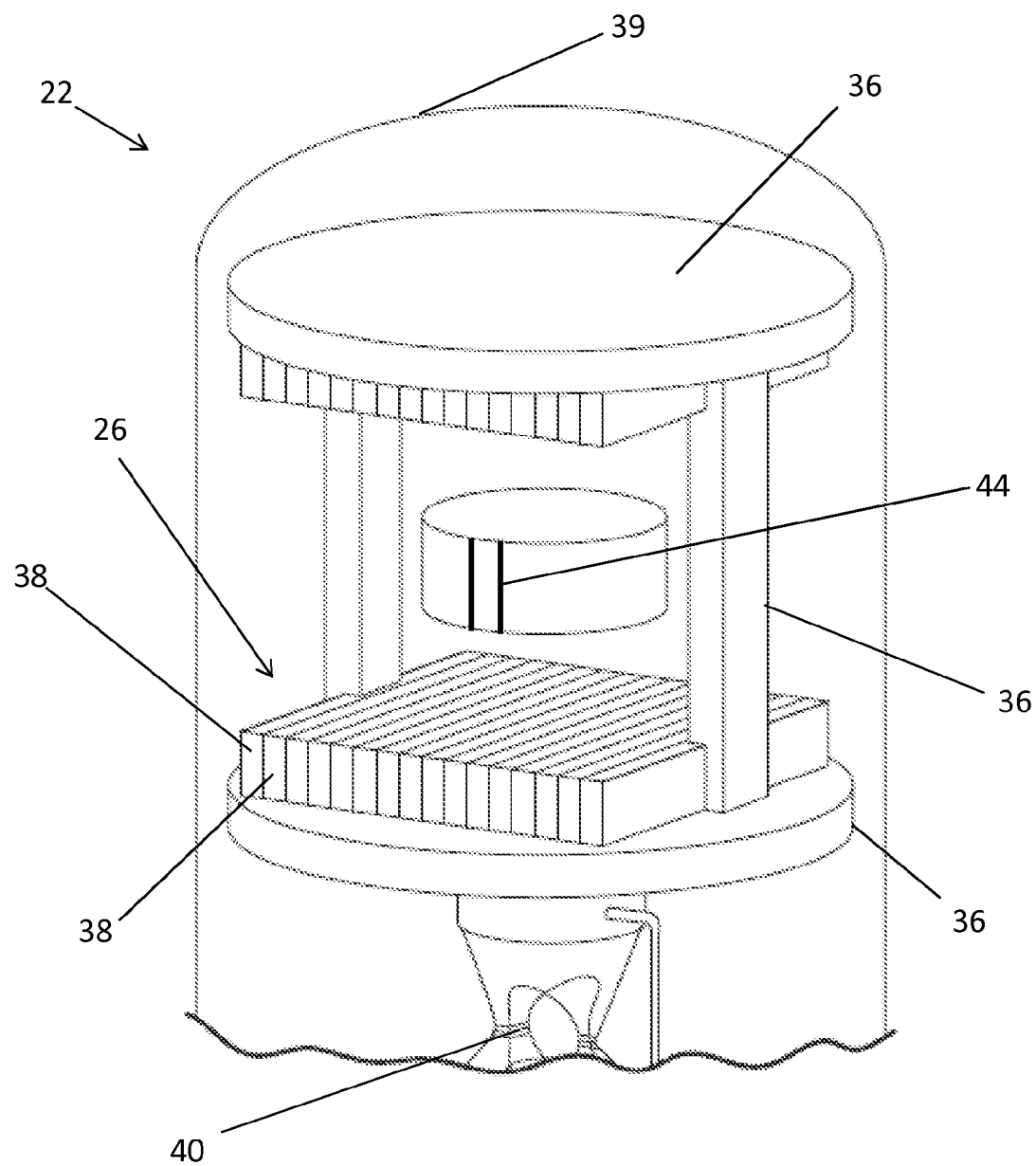
FIG. 5 is a close up of the floating magnet and diamagnets.
Figure 6:
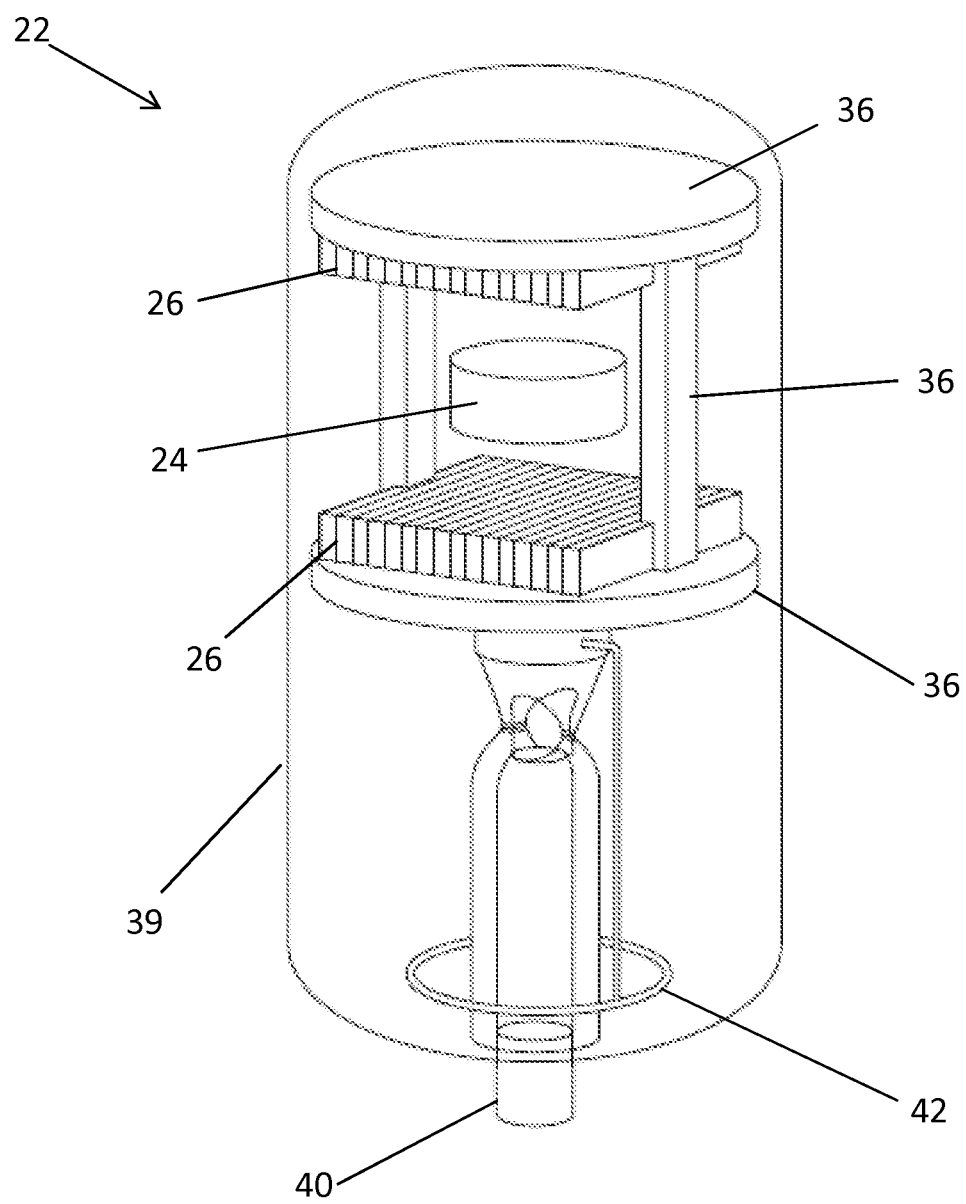
FIG. 6 is a perspective view of the vacuum enclosure of the invented device.

Referring now to FIGS. 5 and 6, FIG. 5 is a close up of the floating magnet 24 and diamagnets 26 in a first embodiment 20. FIG. 6 is a perspective view of the vacuum enclosure 22 of the invented device. In the first embodiment of the present invention the floating magnet 24 is a rare earth magnet (such as NdFeB or SmCo) and is placed between upper and lower diamagnets 26A, 26B constructed of pyrolytic graphite plates or sheets 38 (which may be laminated) inside a high vacuum enclosure 22 made of a glass bulb 39 preferably made of borosilicate glass. The glass bulb 39 could potentially be made of another material as long as it was transparent and would support a vacuum seal. In other versions of the device the upper or lower diamagnet is omitted. Glass mounting pieces 36 are used to position the graphite and these glass mounting pieces 36 are fused to an evacuation tube 40 for the vacuum enclosure 22. The diamagnets 26 are held in place in combination or singular by force fit and adhesive. Care is taken in the design to ensure efficient evacuation of the air around all the pieces in the tube. Air is evacuated through an evacuation tube 40 comprised of a glass straw connected to high vacuum pumps (such as a diffusion pump or turbo pump). During evacuation, a bake-out oven or hood is typically employed to heat the tube and its contents to greater than 250 C. At the end of the bake-out, an RF induction heater is brought near a metal loop containing barium (while maintaining distance from the floating magnet), also known as a getter ring 42, to flash barium metal onto a small area on the wall of the tube. Finally the tube is sealed off by melting the evacuation tube 40 connected to the pump. In the case of a NdFeB floating magnet 24, the bake-out will cause demagnetization and so it will need to be re-magnetized using a coil or electromagnet. SmCo will not demagnetize as long as the temperature is kept below 300 C but will not float with as large a gap as the NdFeB due to its lower magnetization. SmCo has an additional advantage of a smaller temperature coefficient of magnetization which will increase the operating temperature range without accidental contact. If any high vacuum epoxy is used inside the vacuum enclosure 22 (for example to hold the lamination in place), bake-out will likely be limited to about 350 C or less. The vacuum inside the enclosure is preferably less than $10^{-4}$ torr and most preferably $10^{-6}$ torr or less for best results. Lower vacuums are feasible with less effective results. The means to create the enclosure 22 would be similar to the process for making incandescent light bulbs or vacuum tubes. This process would involve slipping a bulb over internal parts affixed to the evacuation tube 40 then sealing the glass during the air evacuation process.

Some of the elements of the present invention are to use an axially symmetric uniform floating magnet 24, and laminated pyrolytic graphite sheets 38 to minimize eddy current damping since the power loss is proportional to the square of the field inhomogeneity in the graphite as the magnet spins and proportional to the square of the laminate thickness. For example, if the spin time in high vacuum is limited to 100 hours due to small field inhomogeneities from a less than perfect magnet causing eddy currents in the graphite, laminating the graphite with sheets 38 more than 10 times thinner than the typical field inhomogeneity wavelength will increase the spin time to more than one year. Lamination of pyrolytic graphite is especially useful due to the anisotropic nature of the material. Eddy currents will only flow effectively in the plane of the graphene sheets due to lower resistivity in this plane. These sheets are parallel to the surface of the block facing the levitating magnet to maximize the diamagnetic force from the nanometer scale electron orbits in pyrolytic graphite. To laminate, the graphite is sliced perpendicular to the graphene sheets 38, limiting the flux and driving voltage for macro-scale eddy currents. These thin sheets 38 can be separated by thin sheets of insulator such as PTFE or glass, or, if the edges of the sheets 38 are supported by a frame or epoxy line, there can be air/vacuum between the sheets 38.

Eddy current damping in the floating magnet 24 is expected be very small because eddy currents are caused by the weak mirror fields from the graphite and the weak and relatively homogeneous field from the lifting magnet 32. Eddy current damping in the vacuum getter ring 42 is also expected to be very small due to distance from the rotating magnet and the thinness of the ring 42. All other materials can be insulating. The invention uses contact for spin up, room temperature operation, a lifting magnet 32, and vacuum tube technology for high vacuum at low cost and compact size. After spin-up, the first embodiment 20 of the present invention is completely passive with no energy inputs. The spin time is incredibly long compared to other devices in common experience. To make it easier to see the rotation of the magnet, the surface should have some marking 44. For example, two quadrants of a cylindrical floating magnet 24 could have a thin gold alloy plating or black diamond-like carbon (DLC) coating. Other suitable materials could be used for markings as long as they did not notably affect the rotation of the floating magnet 24 or vacuum level. Non-magnetic materials could also be attached to the floating magnet for a more impressive display. In this case, these materials should be kept light enough to avoid too great a reduction in the levitation gap that can be achieved. For example, small reflecting mirrors could be attached to the perimeter of the floating magnet to reflect light.

Figure 7:
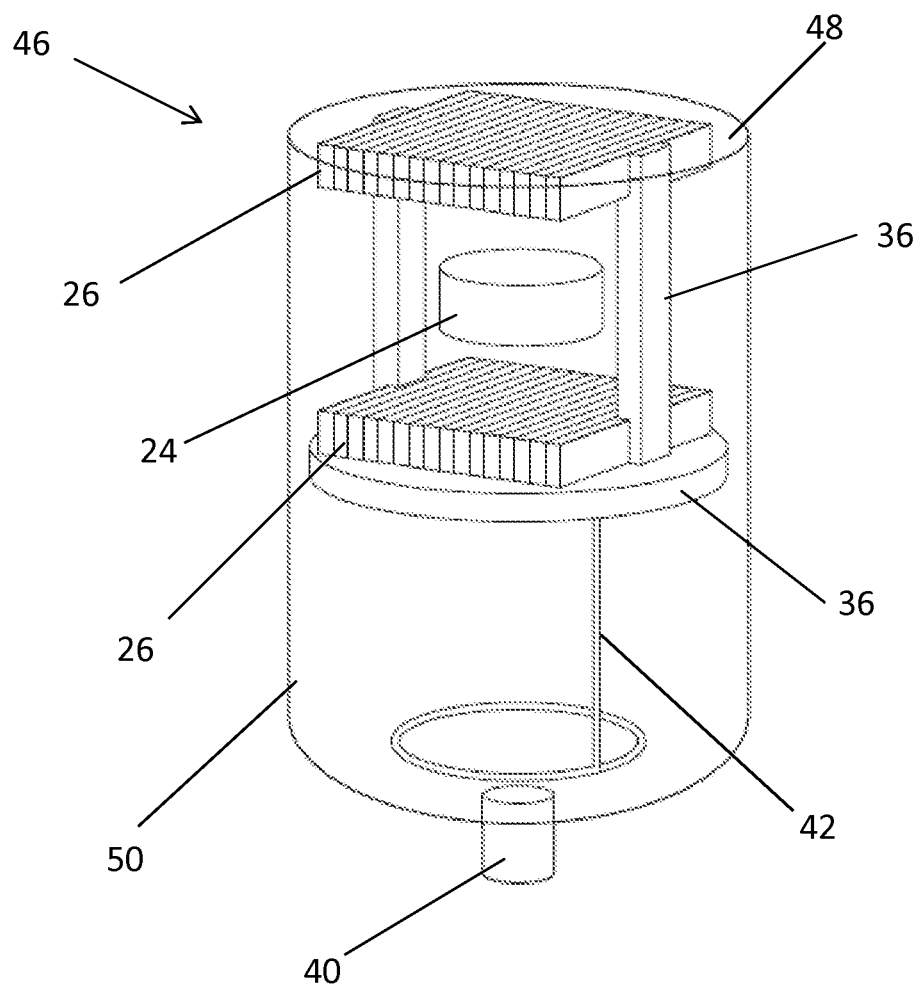
FIG. 7 is an alternate second embodiment of the vacuum enclosure of the present invention.

Referring now to FIG. 7, FIG. 7 is an alternate second embodiment of the vacuum enclosure 46 of the present invention. The second embodiment 46 would be constructed in a different manner. Internal components 26, 36, 42 of the alternate vacuum enclosure 46 would be attached to a glass plug 48 and placed into an alternate glass bulb 50 including an attached evacuation straw 40. Similarly with the first embodiment of the vacuum enclosure 22, the diamagnets 26 made of graphite would use a force fit with glass mounting pieces and, or adhesive to fit into place. When the glass plug 48 is fit into place on the alternate glass bulb 50, the two pieces of glass are fused together which creates a flat surface at the top of the alternate vacuum enclosure 46. The floating magnet would have to be placed into the second embodiment of the vacuum enclosure 46 before the glass plug 48 and the alternate glass bulb 50 were fused together. The alternate vacuum enclosure 46 would be evacuated through an evacuation straw 40 which is part of the alternate glass bulb 50. The evacuation straw 40 would then be sealed similarly to the creation of a vacuum tube or light bulb.

Figure 8:
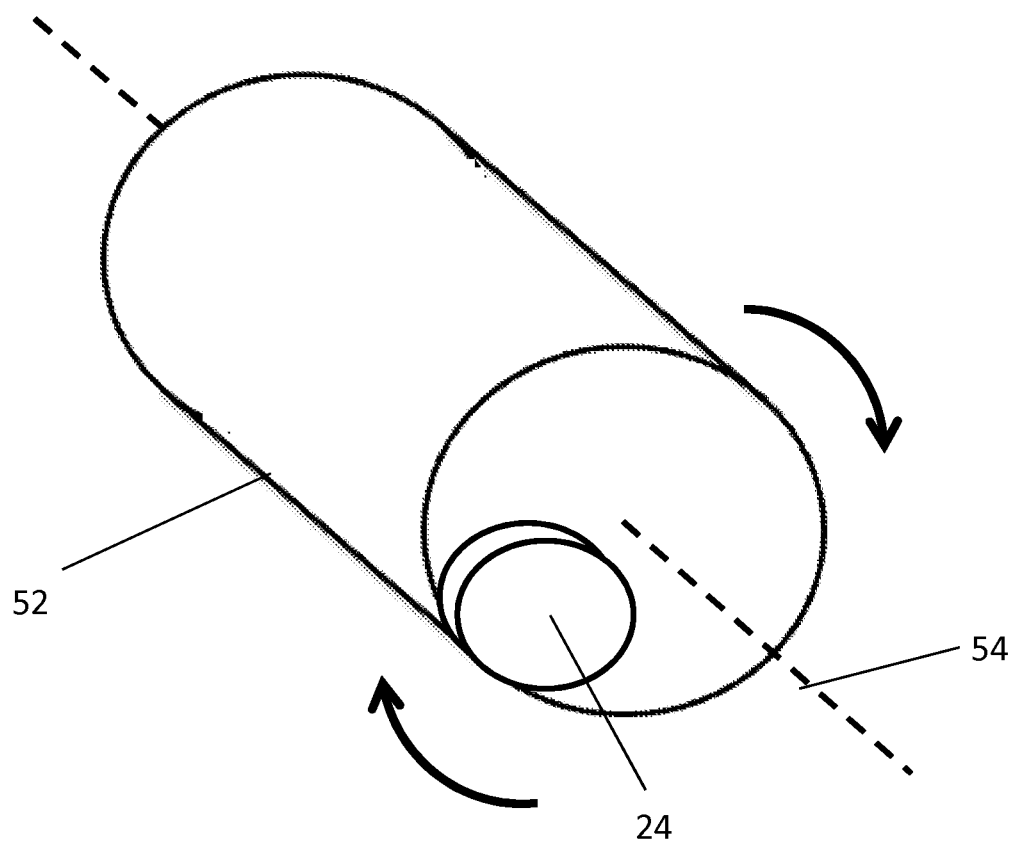
FIG. 8 is an alternate embodiment for imparting rotational momentum.

Though it is preferable that contact surface is perpendicular to the axis of rotation provided by the rotational motor 30, other configurations exist. One such configuration is shown in FIG. 8, FIG. 8 is an alternate embodiment for imparting rotational momentum. would embody a tube 52 parallel to the axis of rotation 54 wherein an axially symmetric floating magnet 24 would be drawn to an inner wall of said tube 52 by an exterior lifting magnet 32 (not shown) and spun up through contact friction with the inner wall of the tube 52 before being pushed, through magnetic or diamagnetic forces, to the center of the tube where the floating magnet 24 would spin freely.

Because the device has been optimized for very low rotational friction, it follows from the fluctuation-dissipation theorem that it is capable of very sensitive measurements of torque with low thermal noise. One useful application where ultra-low torque noise is needed is in measuring Newton's universal gravitational constant "G". This is typically done with a device known as a torsion balance where a test mass is suspended from a thin wire and larger source masses exert a gravitational torque on the test mass. It is generally assumed that the suspending wire behaves as a spring with constant spring constant. Unfortunately this is not the case as any real wire will stretch and change spring constant as a function of time and stress history. By suspending the test mass with magnetic levitation instead of a wire, the resulting configuration can be considerably more stable and "G" may be more accurately determined.

Figure 9:
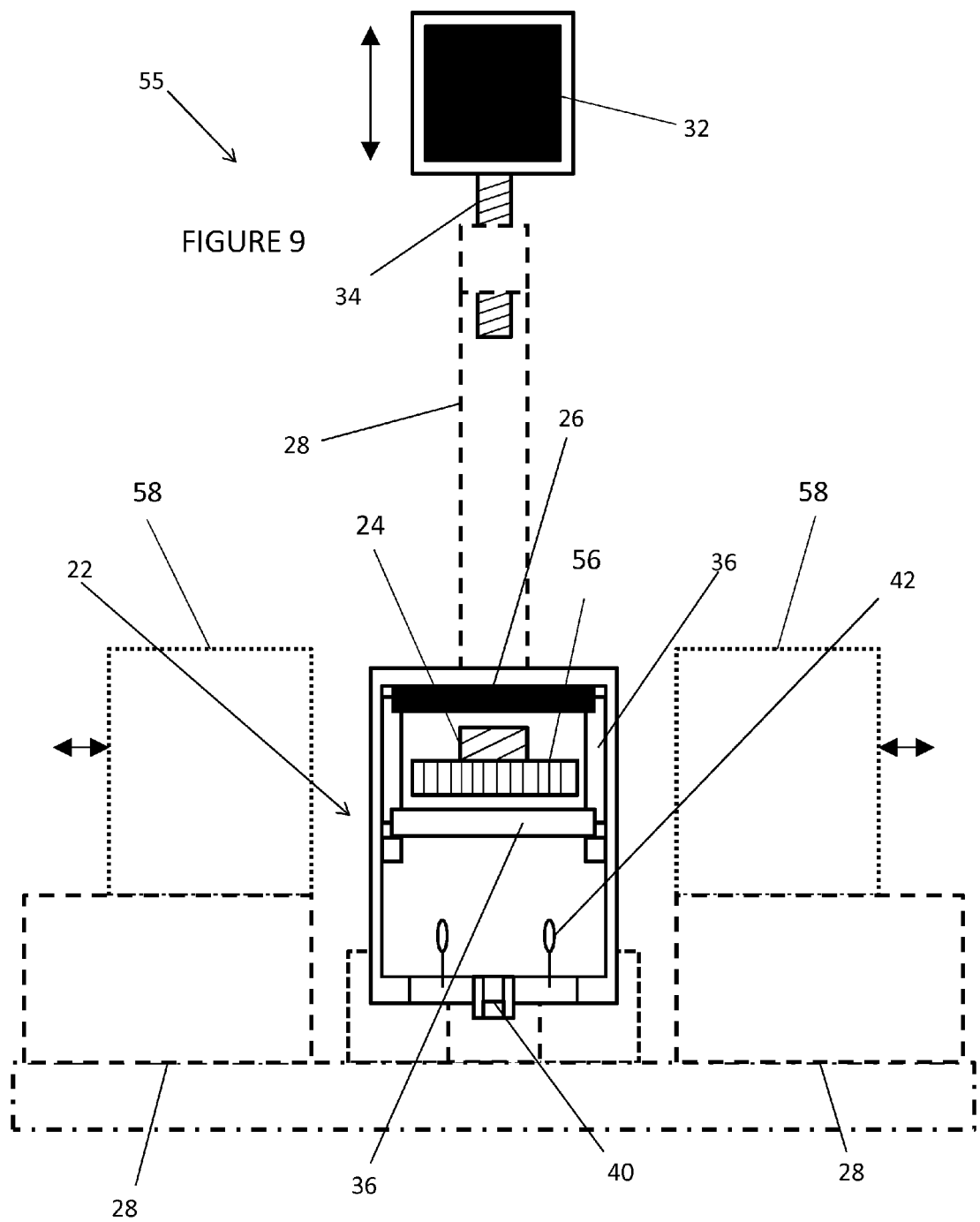
FIG. 9 is a front view of an alternate embodiment of the present invention used to measure gravitational force.
Figure 10:
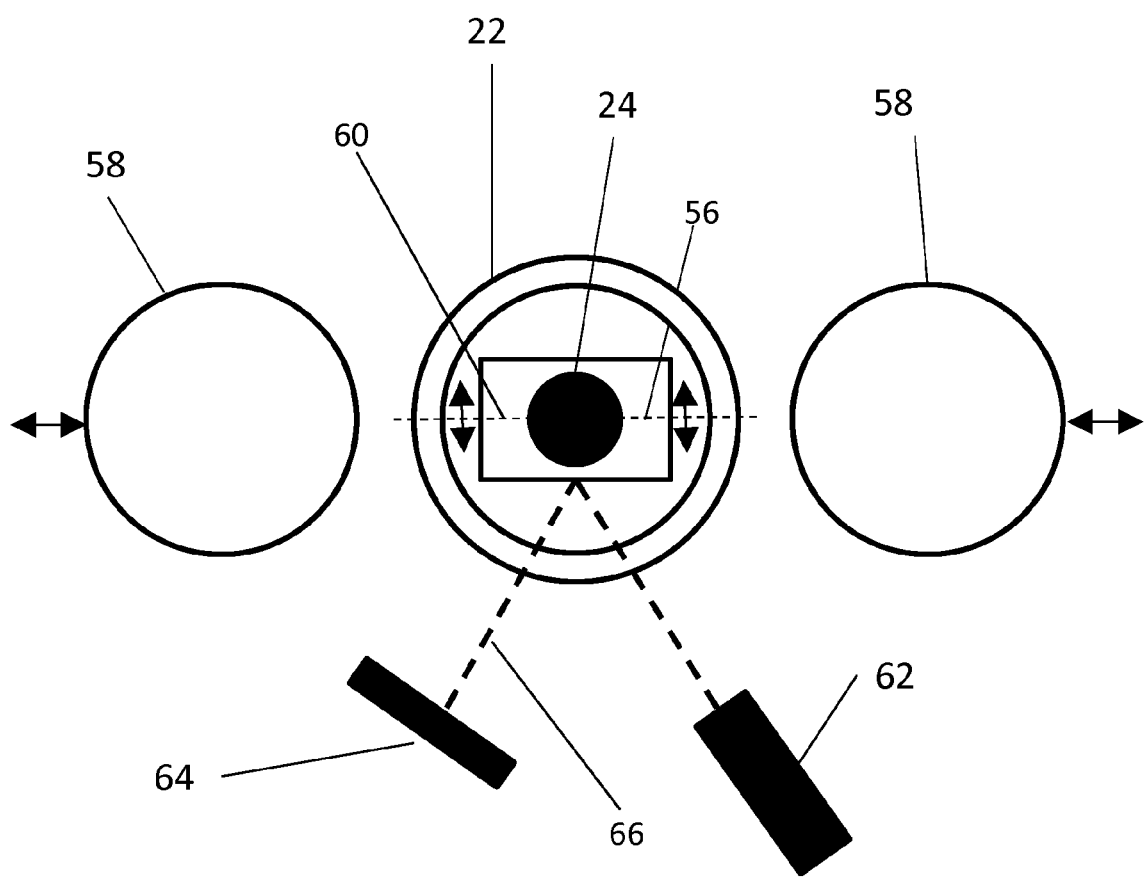
FIG. 10 is a top view of an alternate embodiment of the present invention used to measure gravitational force.

Referring now to FIGS. 9 and 10, FIG. 9 is a front view of an alternate embodiment of the present invention used to measure gravitational force. FIG. 10 is a top view of an alternate embodiment of the present invention used to measure gravitational force. The measurement device 55 includes many of the same components as the first embodiment of the present invention 20. A notable omission of the measurement device 55 from the first embodiment 20 is the lack of the rotational motor 30. The vacuum enclosure 22 of the measurement device 55 would not freely rotate about an axis. An additional change is that only a single diamagnet 26 would preferably be used (although upper and lower diamagnets could also be employed). Preferably this diamagnet would be positioned on the opposite side of the floating magnet 24 from a test mass 56.

The measurement device 55 includes several additions. Attached to the floating magnet 24 is a non-magnetic, conducting test mass 56 with accurately known dimensions and uniform density. For example the test mass 56 may be a slab of single crystal silicon or gold-coated slab of quartz. Two source masses 58 outside the vacuum enclosure 22 are on either side and exert a gravitational attraction to the test mass 56. The gravitational torque aligns the long axis 60 of the test mass 56 with the source masses 58. The source masses 58 would typically be spherical or cylindrical in shape but could have any accurately determined shape. More than two (for example four) source masses 58 could be used. If the test mass 56 is initially not aligned, (for example by temporarily bringing in a third mass off to the side), it will swing in a rotational arc at a frequency that is at least in part due to the gravitational attraction to the source masses 58. As the source masses are brought closer to the vacuum enclosure 22, the force and swinging frequency of the test mass 56 increase. By measuring the frequency as a function of the distance between the test mass 56 and the two source masses 58, other forces on the test mass from other objects can be subtracted and Newton's gravitational constant can be accurately determined.

Without the source masses 58, the test mass 56 will have a preferred orientation due to slight variations in the magnetic or gravitational forces and the source magnets should be aligned with the preferred orientation at the beginning of the experiment. It is very important that magnetic and electrostatic forces from the source mass be made very small since the force of gravity is much smaller than electromagnetic forces. Because of this, the source mass 58 should be made of a non-magnetic material with small magnetic susceptibility. For example some materials like copper and single crystal silicon have very small (slightly diamagnetic) susceptibilities. Slightly diamagnetic materials can also be doped or alloyed with paramagnetic materials to achieve a near-zero susceptibility. Furthermore, electrostatic (metal) or magnetic (mu-metal) shielding can be used around the source masses.

Typically the experiment is conducted deep underground for thermal and seismic stability to get the best accuracy. The source masses 56 and test mass 58 should be grounded to avoid any electrostatic forces. A ground inside the vacuum enclosure 22 can be provided either with a feed-through or by using a metallic vacuum enclosure. The feed-through wire can be brought into the vacuum enclosure in the same way filament wires are brought into a light bulb. Ground should be connected to the support structure 28 under the test mass 58 and the test mass 58 should be brought into contact with the support structure 28 for grounding before levitation. In the case of a metallic vacuum enclosure 22, a transparent window will be needed for optical access. A laser 62 can be used to accurately measure the swinging angle of the test mass 56 by reflecting the beam off the test mass to an array photodetector 64. As the test mass swings there will be an oscillating position of the beam 66 on the photodetector 64.

I claim:

1. A device comprising:
   a. a vacuum enclosure which is permanently sealed and at least partially transparent;
   b. a contact surface, the contact surface inside and affixed to the vacuum enclosure;
   c. a floating magnet, the floating magnet comprised at least in part of a permanent magnet and contained within the vacuum enclosure;
   d. at least one lifting magnet, the at least one lifting magnet supplying an adjustable magnetic field for levitating the floating magnet to an adjustable height, the adjustable height including both a free floating height and an abutting contact surface height;
   e. at least one diamagnet; the at least one diamagnet providing a repulsive magnetic force to the floating magnet to stabilize the levitation of the floating magnet;
   f. a rotational platform, the rotational platform providing an axis of rotation to the vacuum enclosure and contact surface, wherein the rotational platform enables the contact surface to impart rotational momentum to the floating magnet through friction when the floating magnet is at an abutting contact surface height.

2. The device of claim 1 wherein the at least one diamagnet is additionally the contact surface.

3. The device of claim 1 wherein an inner wall of the vacuum enclosure is the contact surface.

4. The device of claim 1 wherein the magnetic field is adjustable by the incorporation of additional lifting magnets.

5. The device of claim 1 wherein the at least one lifting magnet is adjustable through changing the distance between the at least one lifting magnet and the floating magnet.

6. The device of claim 1 wherein the at least one lifting magnet includes an electromagnet and is adjustable in strength through power input.

7. The device of claim 1 wherein the at least one lifting magnet includes a superconductor and the magnet field is adjustable by changing the circulating current of the superconductor.

8. The device of claim 1 wherein the at least one lifting magnet is positioned above the permanent magnet and uses an attractive force to oppose the force of gravity and levitate the permanent magnet.

9. The device of claim 1 wherein the at least one lifting magnet is positioned below the permanent magnet and uses a repulsive force to oppose the force of gravity and levitate the permanent magnet.

10. The device of claim 1 wherein the floating magnet includes a surface marking, markings or attached non-magnetic objects.

11. The device of claim 1 wherein the floating magnet contains a rare earth element.

12. The device of claim 1 wherein the vacuum enclosure is comprised at least in part of borosilicate glass.

13. The device of claim 1 wherein the vacuum enclosure contains a getter material to maintain a gas pressure inside the vacuum enclosure of less than $10^{-4}$ torr.

14. The device of claim 1 wherein the at least one diamagnet is comprised of a material from the list: graphite, pyrolytic graphite, bismuth, or a superconducting material.

15. The device of claim 1 wherein the at least one diamagnet is laminated.

16. The device of claim 1 wherein at least two diamagnets are used with at least one above the floating magnet and at least one below the floating magnet.

17. The device of claim 1 wherein the rotational platform includes a motor that supplies powered rotational momentum to the vacuum enclosure.

18. The device of claim 17 wherein the motor is not permanently affixed to the vacuum enclosure.

19. A method comprising:
   a. containing a floating magnet within a vacuum enclosure;
   b. levitating the floating magnet with a lifting magnet;
   c. rotating the vacuum chamber;
   d. adjusting the lifting magnet with respect to the permanent magnet such that the permanent magnet is drawn to a contact surface inside the vacuum enclosure by a combination of magnetic and gravitational forces;
   e. imparting rotational force from the vacuum chamber to the floating magnet through friction with the contact surface;
   f. adjusting the lifting magnet with respect to the floating magnet such that the floating magnet levitates free from surfaces on the interior of the vacuum enclosure by a combination of magnetic and gravitational forces.

20. The method of claim 19 further comprising:
   a. rotating freely the permanent magnet until ambient conditions cause the permanent magnet to lose rotational motion.

* * * * *